United States Patent
Nien

(10) Patent No.: US 11,078,891 B2
(45) Date of Patent: Aug. 3, 2021

(54) LIGHT-DRIVEN ROTOR APPLIED TO A WATER SURFACE

(71) Applicant: NATIONAL CENTRAL UNIVERSITY, Taoyuan (TW)

(72) Inventor: Cheng-Hsun Nien, Taipei (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 16/824,151

(22) Filed: Mar. 19, 2020

(65) Prior Publication Data

US 2021/0088034 A1    Mar. 25, 2021

(30) Foreign Application Priority Data

Sep. 24, 2019 (TW) ................................ 108134449

(51) Int. Cl.
*F03G 7/06* (2006.01)
*G02B 5/00* (2006.01)

(52) U.S. Cl.
CPC ............... *F03G 7/06* (2013.01); *G02B 5/003* (2013.01)

(58) Field of Classification Search
CPC .................................. F03G 7/06; G02B 5/003
USPC .................... 60/641.1, 641.6–641.15
See application file for complete search history.

(56) References Cited

U.S. PATENT DOCUMENTS 8,899,044 B2 * 12/2014 Okawa ................... B82Y 30/00
60/641.8

OTHER PUBLICATIONS

Chung-Yu Lan, "The Making and Study of Solar Rotors," Thesis published Mar. 20, 2019, National Central University Electronic Theses & Dissertation, Taiwan/National Central Library (Taiwan), 122 pages with English abstract on p. 7.
Hsuan-Han Huang, "A Study of Simulation and Experiment on Solar Rotors" Thesis published Mar. 27, 2019, National Central University Electronic Theses & Dissertation, Taiwan/National Central Library (Taiwan), 98 pages with English abstract on p. 7.

* cited by examiner

*Primary Examiner* — Hoang M Nguyen
(74) *Attorney, Agent, or Firm* — Muncy, Geissler, Olds & Lowe, P.C.

(57) ABSTRACT

A light-driven rotor applied to a water surface includes a bottom plate, a thermally conductive sheet having a base portion covering on an upper surface of the bottom plate and a plurality of leads extended from the border of the base portion and bent downwardly from the edge of the bottom plate to contact the water surface, and a light-absorbing material attached to an upper surface of the thermally conductive sheet for absorbing the light irradiated thereon by a light source and providing light energy required for heating the thermally conductive sheet so that the heat generated by the thermally conductive sheet is conducted to the water surface via the leads to form a gradient change in surface tension, providing a resultant torque for driving the light-driven rotor to rotate. The materials selected for the three-layer structure design of the light-driven rotor are generally applicable, inexpensive and easy to obtain.

12 Claims, 8 Drawing Sheets

LIGHT-DRIVEN ROTOR APPLIED TO A WATER SURFACE

This application claims the priority benefit of Taiwan patent application number 108134449, filed on Sep. 24, 2019.

BACKGROUND OF THE INVENTION

1. Field of the Invention

The present invention related to light-driven rotors and more specifically, to a light-driven rotor applied to a water surface, which has a three-layered structure composed of a bottom plate, a thermally conductive sheet and a light-absorbing material and so designed that when the light-absorbing material absorbs the light from a light source, it provides light energy to heat the thermally conductive sheet so that the heat deposited in the thermally conductive sheet is conducted to the water surface and causes a gradient change in surface tension, thereby providing a resultant torque for driving the light-driven rotor to rotate.

2. Description of the Related Art

Drive technology is indispensable in human life and the applications of production. With the ever-increasing advancement of the modern society and technology, drive technology is also developing towards modernization. Modern advanced drive technology and its application will further promote the continuous development and progress of human society.

For instance, modern and advanced electromagnetic drive technology includes partial improvement based on the original electromagnetic drive technology, together with a new development in general motor technology. In addition, various non-electromagnetic drive technologies are also constantly evolving, such as piezoelectric drive technology, magnetostrictive drive technology, optical drive technology, electrostatic drive technology and molecular motor, etc. Among them, the existing light-driven technology has disclosed a variety of rotors floating on the liquid upon illumination with light to generate heat, and change the surface tension (i.e., the Marangoni effect) to rotate the object, including rotors made by growing carbon nanotubes on a special polycrystalline dimethyl siloxane (PDMS) substrate, and asymmetrically shaped micro-gear rotors made by vapor deposition, laser lithography and chemical etching. Thus, high-power or specific-wavelength lasers, focused sunlight or LED lamps can be used as heating sources to cause the local temperature rise by the heat absorption of the rotor, leading to a gradient change in surface tension and allowing a rotational motion with a non-zero net torque around the rotor as a result of unequal surface tension.

However, an asymmetric micro-gear rotor is quite small (about 18 μm in diameter) and must be fabricated using nanometer processing facility. Even if the size is increased (for example, 5 mm, 10 mm in diameter), there are still problems in order to improve the light absorption efficiency. In other words, the material is difficult to obtain, the manufacturing process is complicated, the processing is difficult, and the cost is very expensive.

SUMMARY OF THE INVENTION

The present invention has been accomplished under the circumstances in view. It is therefore the main object of the present invention to provide a light-driven rotor, which comprises a bottom plate for use as a platform by which the light-driven rotor is located on a water surface, a thermally conductive sheet comprising a base portion covering on the upper surface of the bottom plate and a plurality of leads extended from the border of the base portion and bent downwardly from the edge of the bottom plate to contact the water surface, and a light-absorbing material attached to the upper surface of the thermally conductive sheet for absorbing the light irradiated thereon by a light source and providing light energy required for heating the thermally conductive sheet so that the heat deposited in the thermally conductive sheet is conducted to the water surface via the leads to form a gradient change in surface tension, thereby providing a resultant torque for driving the light-driven rotor to rotate. The materials selected for the three-layer structure design of the light-driven rotor are generally applicable, inexpensive and easy to obtain, so that the structure of the light-driven rotor is simple, easy to manufacture and cost-effective.

According to another aspect of the present invention, a space is reserved between the sides of the base portion of the thermally conductive sheet to the edge of the bottom plate to avoid the problem that the sides of the thermally conductive sheet are too close to the edge of the bottom plate, thereby preventing the undesired contact with the water surface. Thus, except for the lead at each corner of the base portion, any other portion of the thermally conductive sheet does not conduct heat to the water. Moreover, each lead is folded back to the bottom of the bottom plate flatly and attached to the bottom surface of the bottom plate to effectively reduce the energy dissipation by fluid resistance, ensuring that the thermal energy generated in the thermally conductive sheet is conducted to the water. In addition, the width of the leads of the thermally conductive sheet and the relative position of contacting the water surface determine the variation of the local heating on the water surface, and are related to the range of local heating, so the width of each lead contacting the water surface and its contact position have a significant impact on the resultant torque and the angular speed of the rotor due to the surface tension.

According to still another aspect of the present invention, the thermally conductive sheet is preferably a copper foil for electrolysis having a matted surface. The reason is that it can utilize the characteristics of fast heat conduction, and the light-absorbing material (such as graphite, carbon tape, etc.) can be conveniently coated on the matted surface of the copper foil, so that the copper foil with graphite attached has a very high heat absorption rate. And because the rotor is irradiated from the beginning to the continuous rotation, the heating temperature can be stably sustained and the heat is not accumulated due to the time extension, so that the water surface can maintain a stable temperature gradient distribution to provide continuous rotation of the rotor.

Other advantages and features of the present invention will be fully understood by reference to the following specification in conjunction with the accompanying drawings, in which like reference signs denote like components of structure.

DETAILED DESCRIPTION OF THE PREFERRED EMBODIMENTS

Figure 1:
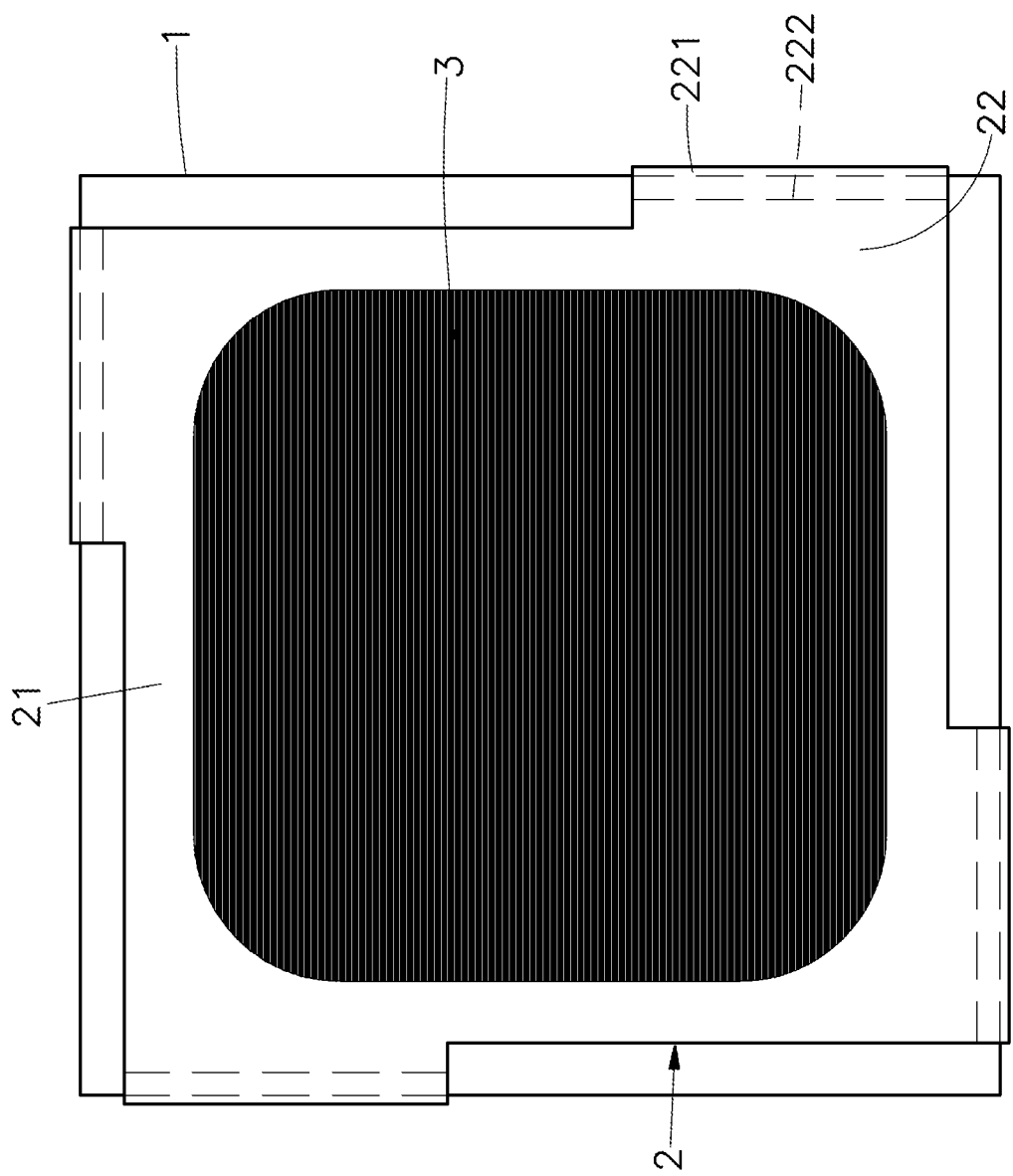
FIG. 1 is a top view of a light-driven rotor in accordance with a first embodiment of the present invention.

Referring to FIGS. 1-4, a top view of the preferred embodiment of the present invention, a plain view of the thermally conductive sheet of the preferred embodiment of the present invention, a side view of the preferred embodiment of the present invention and an applied view of the preferred embodiment of the present invention are shown. As illustrated, the light-driven rotor generally comprises a bottom plate 1, a thermally conductive sheet 2 and a light-absorbing material 3.

The bottom plate 1 is preferably implemented as a polygonal rigid bottom plate (especially with geometric symmetry), such as a square cover slip made of glass or plastic, but not limited thereto. The bottom plate 1 can also be a non-rigid bottom plate made of a material that does not soften, deform, or adsorb the water, such as a glass fiber reinforced plastic plate. The density of the bottom plate 1 is not greater than the density of the liquid (such as water in the container, water for gardening or farming) (i.e., the density of the bottom plate 1 is equal to or less than the liquid), or the weight of the bottom plate 1 is sufficiently low to be supported by the buoyancy and surface tension generated by the liquid. The bottom plate 1 preferably has a poor thermal conductivity, that is, when the bottom plate 1 is located on the water surface, it is not easy to conduct heat to the water surface and cause temperature of the water surface to change.

In the following embodiments of the present invention, the bottom plate 1 is preferably implemented in a square shape, mainly because the material can be simply used by cutting, stamping, and the like to produce the most bottom plate area, which not only reduces material waste, in terms of material utilization and rotation effect of the bottom plate 1, it is also the best application.

The thermally conductive sheet 2 is a flexible sheet and is preferably a copper foil for electrolysis having at least one roughened surface but is not limited thereto. The thermally conductive sheet 2 can also be made of aluminum foil, silver foil, carbon fiber sheet, thermally conductive silicone film or other thermally conductive flexible material. The roughened surface may be the matted surface of the copper foil for electrolysis or the aluminum foil itself, or a surface subjected to roughening treatment (for example, by attaching metal fine particles, forming a fine uneven structure after surface etching, etc.). The thermally conductive sheet 2 is shaped like the shape of the bottom plate 1, comprising a base portion 21 covering a middle part of an upper surface of the bottom plate 1 and a plurality of leads 22 extended from the border or corners of the base portion 21 and located at the edge of the bottom plate 1.

In this embodiment, the base portion 21 of the thermally conductive sheet 2 is a square design similar to the bottom plate 1, and the leads 22 are respectively extended from the four corners of the base portion 21. Each lead 22 is bent downward from the edge of the bottom plate 1 to form a contact segment 221, and the contact segment 221 is further inwardly bent to form a positioning tip 222, which is flatly attached to the bottom surface of the bottom plate 1. Thus, the shape of the design of the thermally conductive sheet 2 is asymmetric or rotationally symmetric.

The light-absorbing material 3 may be graphite and uniformly adhered to the roughened surface (i.e., the upper surface) of the thermally conductive sheet 2 but is not limited thereto. The light-absorbing material 3 can also be made of a carbon tape, a carpet of carbon nanotubes, a graphene or other material that exhibits a near-black body effect to enhance the heat absorption rate of the thermally conductive sheet 2. The light-absorbing material 3 can also be formed on the roughened surface of the thermally conductive sheet 2 by means of bonding, chemical vapor deposition or the like depending on the type of the light-absorbing material 3. Therefore, in the contents of the following description of the preferred embodiments, they are explained together and combined.

When the present invention is fabricated, the thermally conductive sheet 2 (such as copper foil) is first cut into a polygonal shape (such as a square, a regular hexagon, a star shape, etc.), and then the light-absorbing material 3 (such as graphite from a 9B graphite crayon or a charcoal pencil) is uniformly adhered to the roughened surface (such as a matted surface) of the thermally conductive sheet 2 by coating, and then the upper surface of the bottom plate 1 is evenly coated with a thin layer of vacuum grease, ointment or water repellent to form a hydrophobic film. However, if the upper surface of the bottom plate 1 (such as a plastic cover slip or graphite) itself is hydrophobic, the step of applying the hydrophobic film can be skipped. In addition, a minimum amount of quick-drying glue is applied to the four corners of the non-roughened surface of the base portion 21 (such as the bright surface, that is, the lower surface) of the thermally conductive sheet 2 by spot gluing (the amount of glue dispensing can be adjusted according to the fixing strength between the two, but based on the principle of not increasing the heat transfer). The surface of the bottom plate 1 coated with the thin layer of vacuum grease (i.e., the upper surface) is put on the surface of the base portion 21 of the thermally conductive sheet 2 that is coated with the quick-drying glue, so that the thermally conductive sheet 2 and the bottom plate 1 are firmly bonded. (Special care should be taken to prevent the lower surface of the thermally conductive sheet 2 from attaching to any vacuum grease in this step.) After bonding, the combination of the bottom plate 1 and the thermally conductive sheet 2 is turned over to face up. Then, the leads 22 that extend from the four corners of the base portion 21 of the thermally conductive sheet 2 to the edge of the bottom plate 1 are bent downward or folded back to closely attach to the bottom surface of the bottom plate 1. Thus, the preparation of rotor of the present invention is completed.

In this embodiment, a gap is formed between the bottom plate 1 and the thermally conductive sheet 2. When the upper surface of the bottom plate 1 is not coated with a thin layer of vacuum grease, the four corners of the thermally conductive sheet 2 are bonded to the upper surface of the bottom plate 1 by using a quick-drying glue, so that a gap is formed between the bottom plate 1 and the thermally conductive sheet 2, reducing the heat generated by the thermally conductive sheet 2 from being directly transmitted to the bottom plate 1. In addition, if the surface of the bottom plate 1 facing the thermally conductive sheet 2 is further coated with a thin layer of vacuum grease, the micro gap between the two may be made hydrophobic to avoid water infiltration due to capillary action, which can absorb the heat generated in conductive sheet 2 to degrade the effect of heat conduction.

Figure 2:
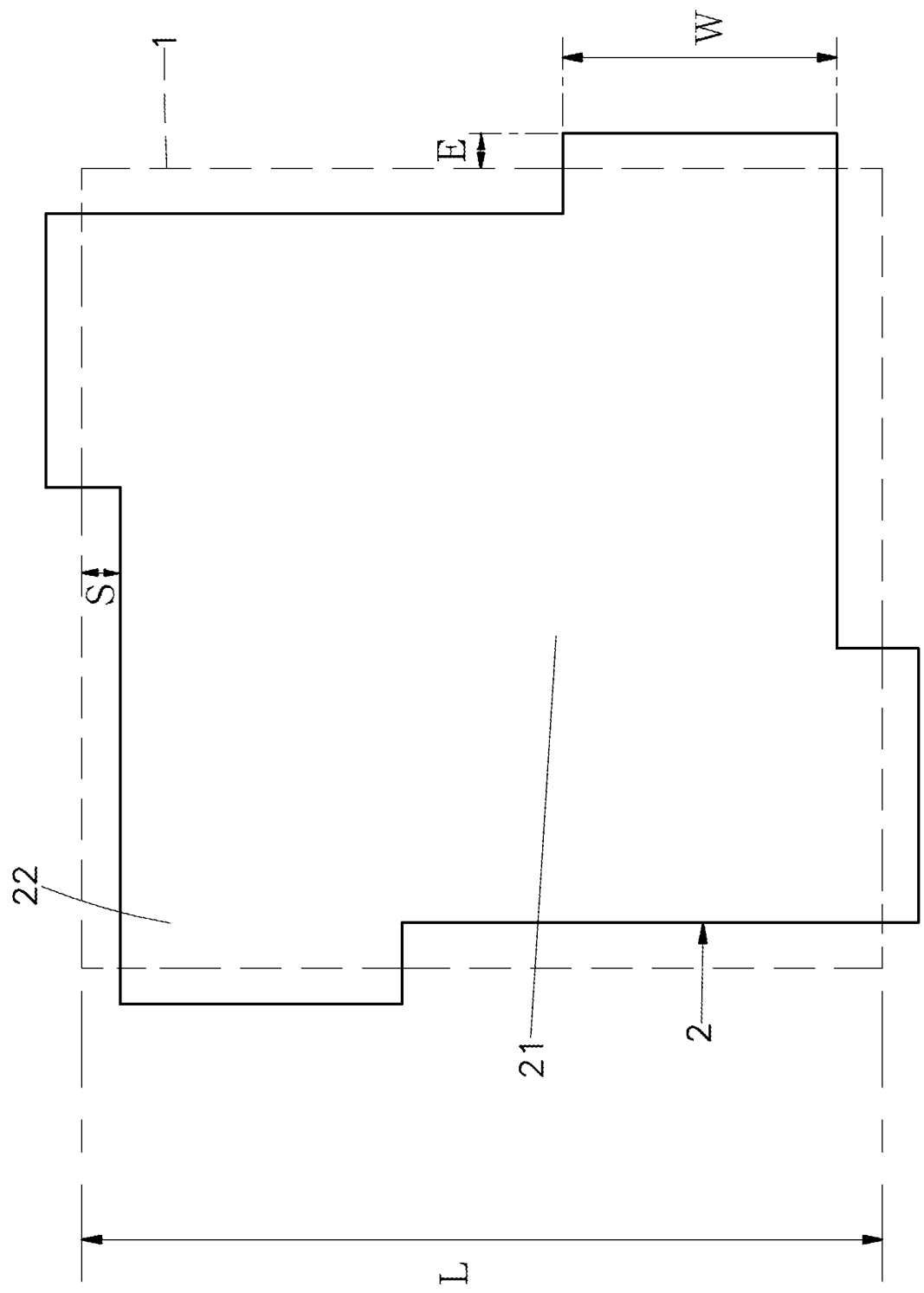
FIG. 2 is a plain view of the thermally conductive sheet of the light-driven rotor of the first embodiment of the present invention.
Figure 3:
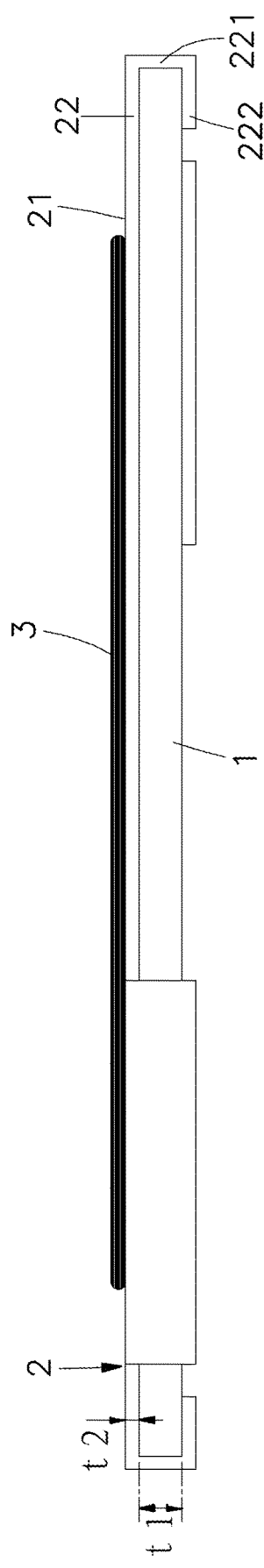
FIG. 3 is a side view of the light-driven rotor of the first embodiment of the present invention.
Figure 4:
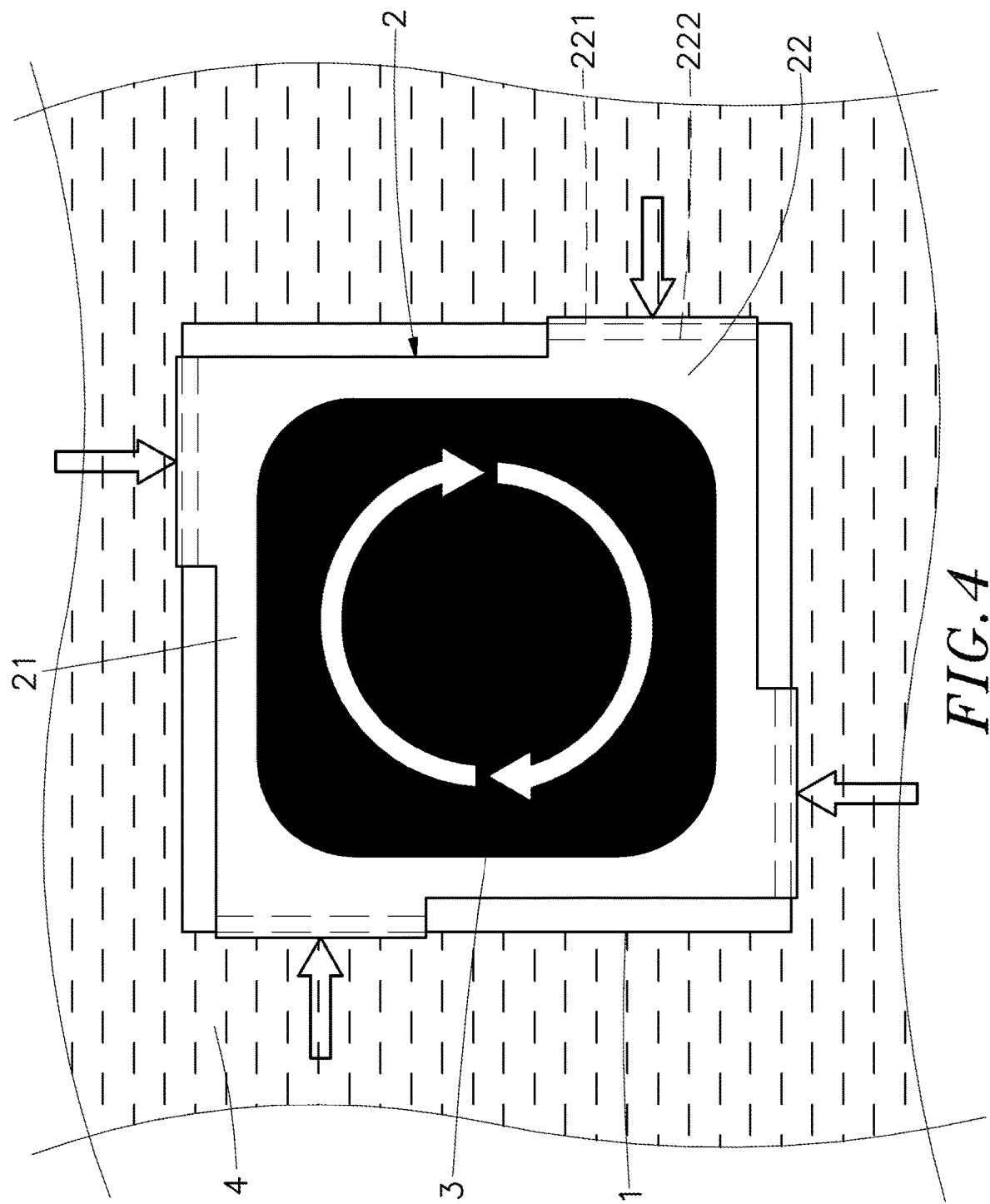
FIG. 4 is a schematic applied view of the state of the first embodiment of the invention when the light source is illuminated.

As shown in FIG. 2, the bottom plate 1 is preferably a square having a length L=18 mm on each side but is not limited thereto. Alternatively, the length L can be 22 mm, 24 mm or other commercially available length. A space S=1 mm can be reserved between the sides of the base portion 21 of the thermally conductive sheet 2 to the edge of the bottom plate 1 to avoid the problem that the sides of the thermally conductive sheet 2 are too close to the edge of the bottom plate 1, thereby preventing the possibility of contact with the water surface. Thus, except for the lead 22 at each corner of the base portion 21, any other portion of the thermally conductive sheet 2 cannot conduct heat to the water. Moreover, since each lead 22 is folded back to the bottom of the bottom plate 1 and has a length E=1 mm, the positioning tip 222 is flatly attached to the bottom surface of the bottom plate 1 to effectively reduce the resistance, and at the same time, the fixing effect for stable positioning can be achieved, further ensuring that the thermal energy generated in the thermally conductive sheet 2 is conducted to the water through designated leads only.

In addition, the width W=2~6 mm of the leads 22 of the thermally conductive sheet 2 contacting the water surface and the contact position determine the variation of the local heating on the water surface, and are related to the range of local heating, so the width of each lead 22 contacting the water surface and its contact position have a significant impact on the resultant torque and the angular speed of the rotor on the water surface. Further, the bottom plate 1 and the thermally conductive sheet 2 may have a thickness $t1=150$ μm and $t2=35$ μm, respectively, but are not limited thereto. Any simple modifications and equivalent structural changes that are made by using the specification and the drawings of the present invention are all included in the scope of the patent of the present invention.

When the rotor of the present invention is placed on a water surface 4 to be in a floating state, light from a light source (such as sunlight or a high-intensity flashlight, etc.) is irradiated on the center area of the light-absorbing material 3 on the surface of the thermally conductive sheet 2, so that the illuminance of the light-absorbing material 3 can be the range of illumination of the sunlight (for example, 300~1700 $W/m^2$). Or by means of a magnifying glass focusing or other concentrated light source illumination, the illumination of the light source is above 1700 $W/m^2$. Preferably, the illumination is in the range of 1000~1400 $W/m^2$. It can provide the light energy (such as 5.18~6.8 W) required for the thermal conduction sheet 2 to rise from the temperature at the beginning of irradiation (such as 21° C. close to the water temperature) to a stable high temperature (such as 30~50° C.). At the same time, the generated heat is transmitted to the lower temperature water surface 4 via the plurality of leads 22 of the thermally conductive sheet 2, and the surface tension gradient is formed by locally heating the water surface 4 of the same side (i.e., the leads 22 contact with a small area of the water surface 4, so that the surface temperature of the water surface 4 changes to produce a difference in surface tension). It can be operated by the characteristics that the surface tension changes with temperature, so that the surface tension of the rotor at each corner of the bottom plate 1 is not equal (that is, the resultant force is not zero) or the resultant force is zero, the applied torque is not zero, resulting in movement or rotation. The rotation speed of the rotor is positively correlated with the illumination of the light source, that is, the stronger the illumination of the light source will drive the rotor to have a shorter rotation cycle and the rotation speed is higher (the terminal rotation speed is about 2.55~3.2 rad/s). However, after the rotor is exposed to the light source for a period of time, the speed of rotation will not increase anymore, because the light energy absorbed by the rotor is only used to balance the negative work done by the viscous resistance of the water surface 4 against relative motion. In the present embodiment, the reason why the thermally conductive sheet 2 of the rotor is selected from a copper foil having matted surface for electrolysis is that it can utilize the characteristics of fast heat conduction, and the light-absorbing material 3 (such as graphite from a 9B graphite crayon or a charcoal pencil, carbon tape, etc.) can be conveniently coated on the matted surface of the copper foil, so that the copper foil with graphite attached has a very high heat absorption rate. And because the rotor is irradiated from the beginning to the continuous rotation, the heating temperature can be stably sustained (such as 31~31.6° C.), and the heat is not accumulated due to the time extension, so that the water surface can maintain a stable temperature gradient distribution to provide continuous rotation of the rotor. As long as the light source is not interrupted or the intensity is not attenuated, the rotor will rotate continuously. The materials selected for the three-layer structure design of the bottom plate 1, the thermally conductive sheet 2 and the light-absorbing material 3 of the rotor are generally applicable, inexpensive and easy to obtain. If a glass or plastic cover slip is used as the bottom plate 1, a copper foil for electrolysis is used as the thermally conductive sheet 2, and graphite is used as the light-absorbing material 3, it is relatively easy to make in the process of production, for example, only cutting, coating, folding, aligning and bonding procedures are required, so that the structure is simple, easy to manufacture and cost-effective.

Figure 5:
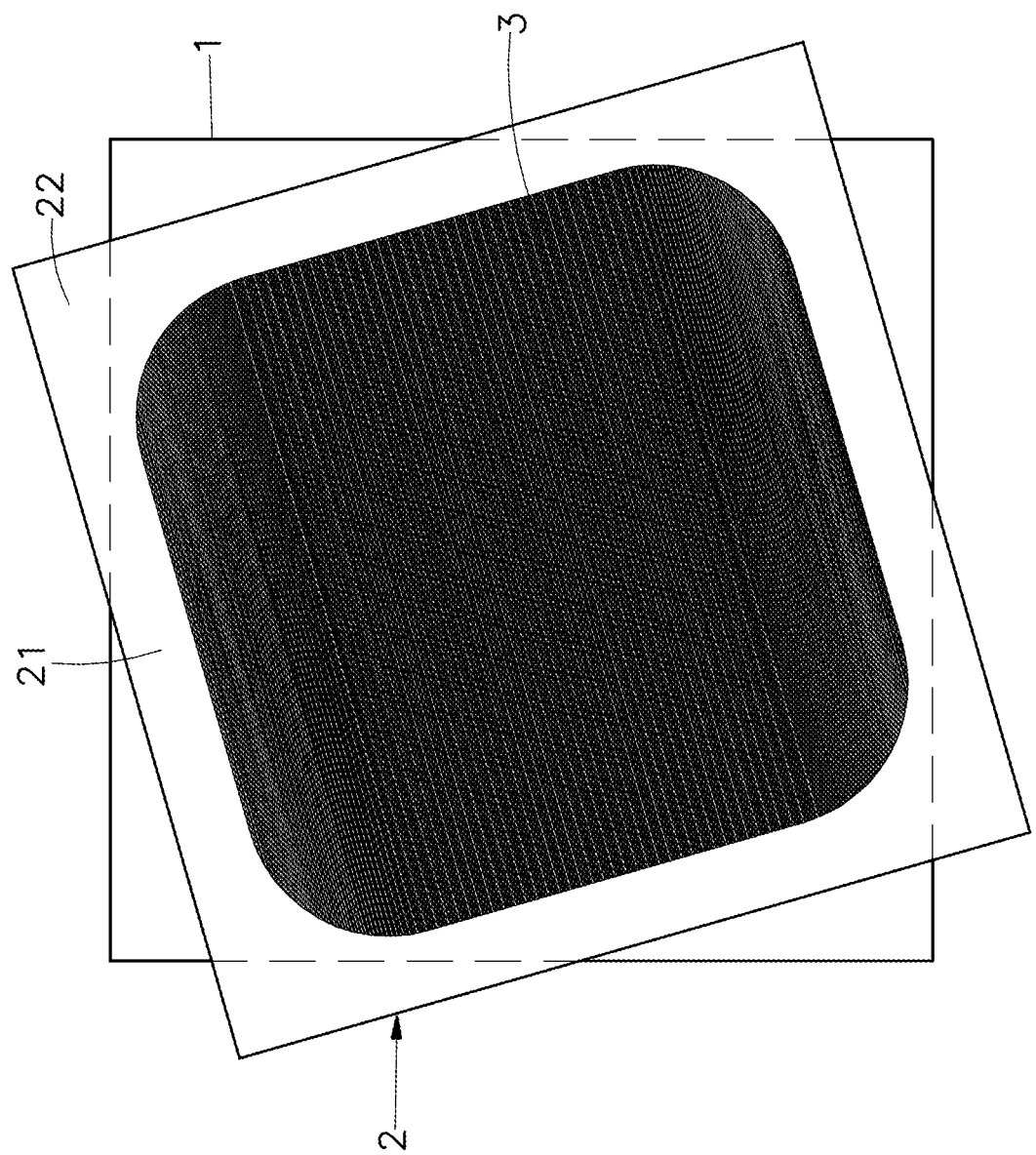
FIG. 5 is a schematic top view of a light-driven rotor in accordance with a second embodiment of the present invention before bending of the thermally conductive sheet.
Figure 6:
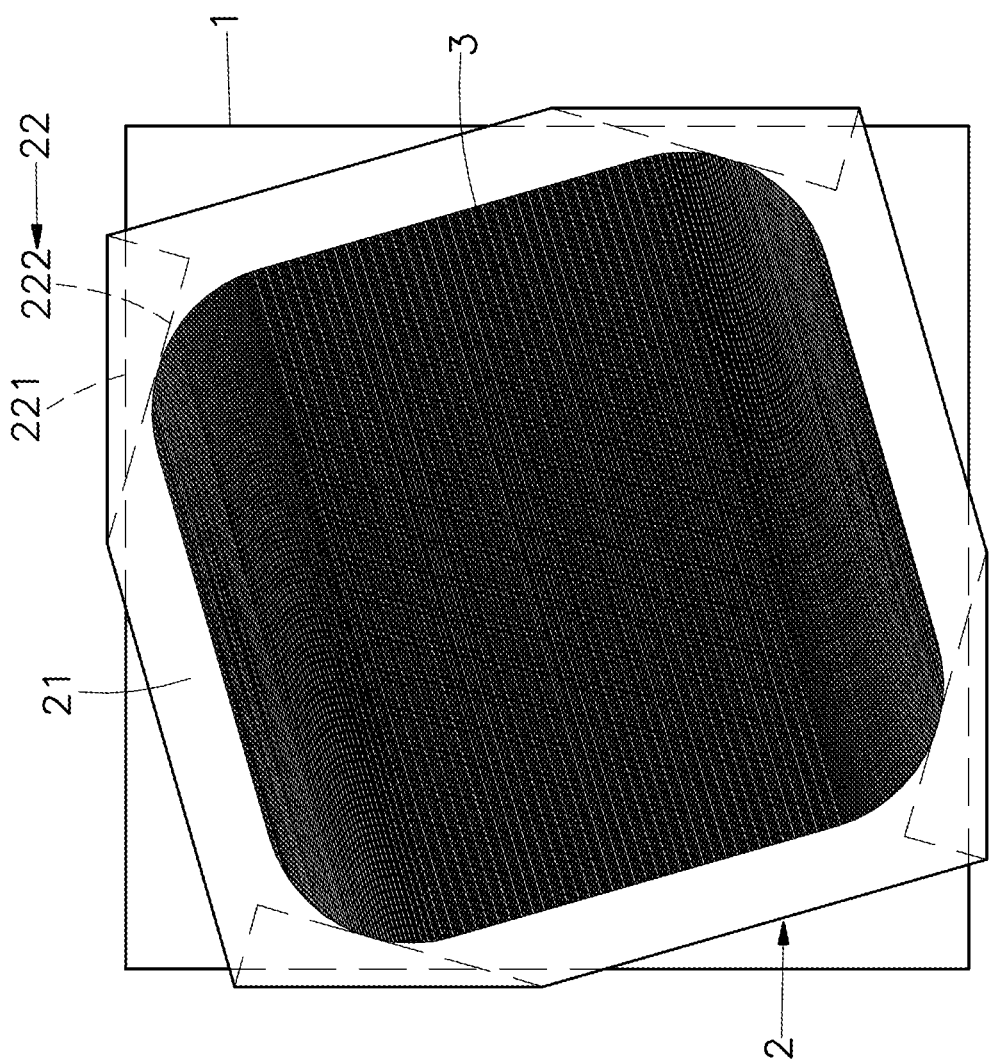
FIG. 6 is a schematic top view of the light-driven rotor in accordance with the second embodiment of the present invention after bending of the thermally conductive sheet.

FIGS. 5 and 6 are schematic top views before and after bending of the thermally conductive sheet of an alternate form of the present invention. In this embodiment, the bottom plate 1 and the thermally conductive sheet 2 are squares of the same size, and are rotationally offset from each other by an angle. The four corners of the base portion 21 of the thermally conductive sheet 2 are bent downward from the edge of the bottom plate 1 to form contact segments 221 of leads 22, and the contact segments 221 are further inwardly bent to form respective positioning tips 222, which are flatly attached to the bottom surface of the bottom plate 1. It is also possible to further apply quick-drying glue to the four corners to ensure the fixation between the bottom plate 1 and the thermally conductive sheet 2. The thermally conductive sheet 2 uses a square having the same area as the bottom plate 1, facilitating the material acquisition. Further, the corners of the base portion 21 are directly folded back on the bottom surface of the bottom plate 1 without cutting, simplifying the production process and effectively saving material use and production costs.

Figure 7:
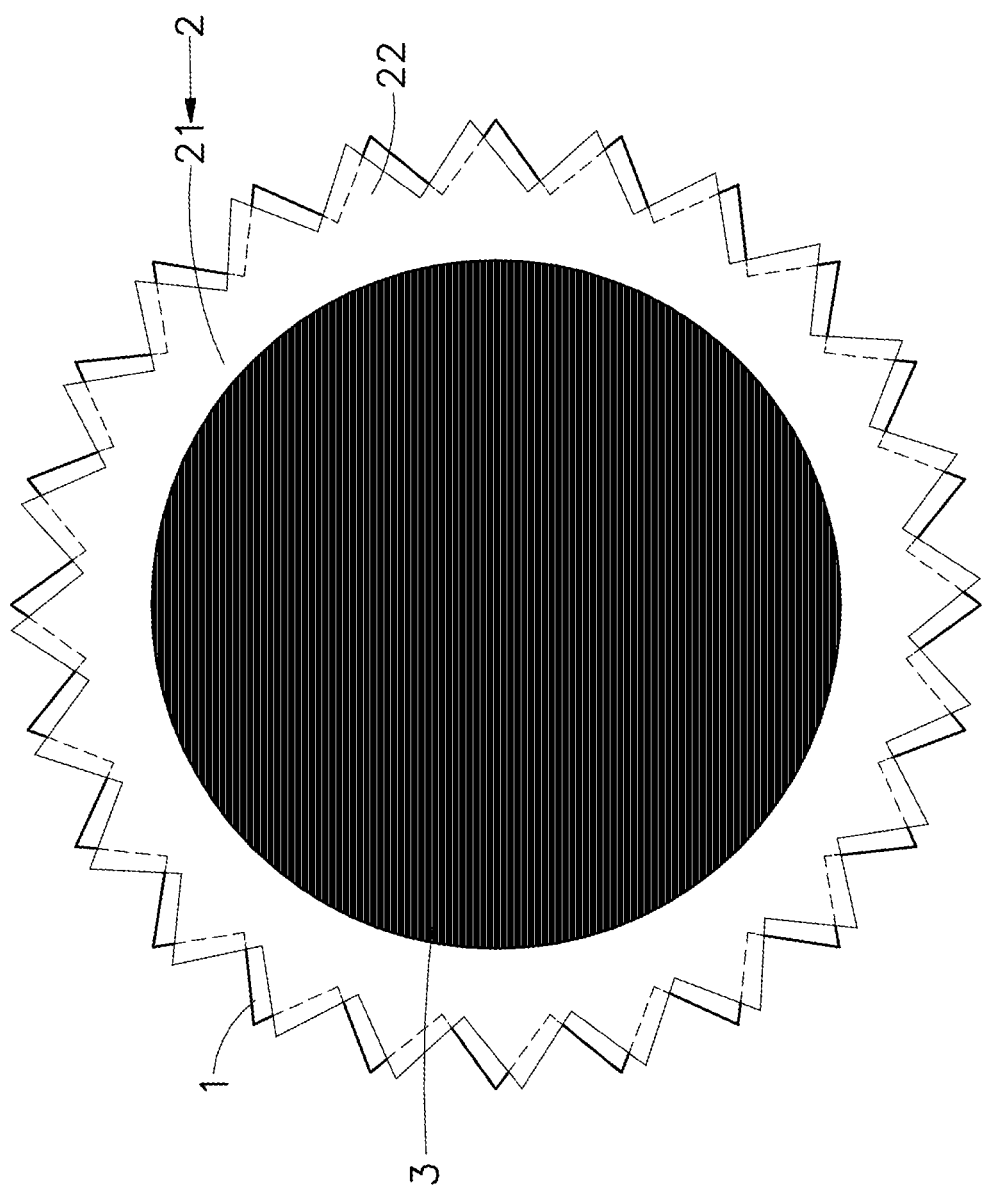
FIG. 7 is a top view of a light-driven rotor in accordance with a third embodiment of the present invention.
Figure 8:
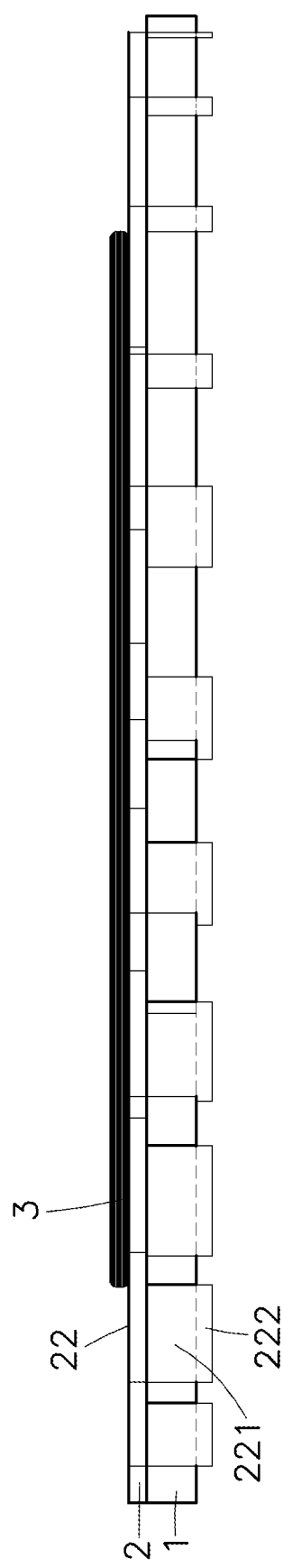
FIG. 8 is a side view of the light-driven rotor in accordance with the third embodiment of the present invention.

FIGS. 7 and 8 are top view and side view of another alternate form of the present invention. In this embodiment, the structure of the rotor is substantially similar to that shown in FIG. 4 with the exceptions as outlined hereinafter. The bottom plate 1 and the thermally conductive sheet 2 are respectively a toothed disc plate, and the sizes thereof may be the same or substantially the same, but they are rotationally offset from each other by an angle. A plurality of tooth-like leads 22 are formed around the circular base portion 21 of the thermally conductive sheet 2, and the tips of the leads 22 are respectively folded back and flatly attached to the bottom surface of the bottom plate 1. The light-absorbing material 3 is adhered to the surface of the base portion 21 of the thermally conductive sheet 2. Although the overall shape (such as square, regular hexagon, star shape, tooth disc shape, etc.) and size will vary, it is characterized by the change in surface tension with temperature. By the small area contact of the thermally conductive sheet 2 with the water surface 4, the local temperature of the water surface 4 changes to produce a difference in surface tension to effectively provide the resultant torque required to drive the rotor to rotate. And the direction of rotation of the rotor can also be rotated clockwise or counterclockwise depending on the relative position of the water surface 4 heated by the plurality of leads 22 of the thermally conductive sheet 2. The rotor of the above embodiment of the present invention is applicable to, but not limited to, scientific education implement equipment, toy development, fish farming equipment, garden landscaping equipment, landscape engineering equipment, outdoor installation art or lighting art design. If the rotor is applied to a science education implement, the bottom plate 1 can be directly placed on the water surface 4 as a platform for the rotor to float, and the light source is irradiated to the light-absorbing material 3, causing the thermally conductive sheet 2 to locally heat the water surface 4. Thus, using the characteristics that the surface tension changes with temperature, the rotor can be moved or rotated by the surface tension, which can be used as a teaching material to change the surface tension of water by the heating temperature of the light source. It not only provides opportunities for students to practice, but also enhances the interest of scientific experimentation and learning, and also is beneficial to inspire multiple innovations in the use of solar energy. In addition, the surface of the bottom plate 1 of the rotor may be further attached or coated with a luminescent material (such as a fluorescent powder, a luminous strip, a self-luminous tape, etc.) that does not affect the light source illuminating the light-absorbing material 3, allowing the rotor to be used as a garden decoration, landscape engineering, outdoor installation or lighting art design. The bottom of the bottom plate 1 of the rotor can also be positioned on the water surface 4 by a mooring system (such as cable, anchor chain, etc.) or a shaft. If the bottom of the bottom plate 1 is connected with a shaft with blades, the rotor can drive the shaft and the blades to agitate the water, so that the rotor can be used in aquaculture equipment (water wheel aerator for finishing rod). A plurality of rotor structures may be meshed with each other to form a combination of gears to multiply the torque for driving the shaft of a motor or generator, or other related equipment or apparatus that can further apply the rotation of the rotor on the liquid. Other simple modifications and equivalent structural changes that are made by using the specification and the drawings of the present invention are all included in the scope of the present invention.

In conclusion, the invention provides a light-driven rotor, which comprises a bottom plate 1 placed on a water surface 4, a thermally conductive sheet 2 comprising a base portion 21 covering an upper surface of the bottom plate 1 and a plurality of leads 22 provided around the base portion 21 and bent from the edge of the bottom plate 1 to contact the water surface 4, and a light-absorbing material 3 attached to an upper surface of the thermally conductive sheet 2. When the light-driven rotor is placed on the water surface 4, light from a light source is irradiated on the light-absorbing material 3 on the upper surface of the thermally conductive sheet 2, allowing the generated heat to be transmitted to the water surface 4 via the plurality of leads 22 of the thermally conductive sheet 2, and the surface tension gradient is formed by locally heating the water surface 4, so that the surface temperature of the water surface 4 changes to produce a difference in surface tension around the perimeter. The rotor is subjected to surface tension, which may move or rotate due to the non-zero resultant force or torque. The materials (such as cover slip, copper foil and graphite) selected for the three-layer structure design of the light-driven rotor are generally applicable, inexpensive and easy to obtain, so that the structure of the light-driven rotor is simple, easy to manufacture and cost-effective.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A light-driven rotor applied to a water surface, comprising:
   a bottom plate for use as a platform on which the light-driven rotor is located on said water surface;
   a thermally conductive sheet comprising a base portion covering on an upper surface of said bottom plate and a plurality of leads extended from the border of said base portion and bent downwardly from the edge of said bottom plate to contact said water surface, said leads being used to set the position where said water surface is to be heated; and
   a light-absorbing material attached to an upper surface of said thermally conductive sheet for absorbing the light irradiated thereon by a light source and providing light energy required for heating said thermally conductive sheet, enabling the heat generated in said thermally conductive sheet to be conducted to said water surface via said leads to form a gradient change in surface tension, thereby providing a resultant torque for driving the light-driven rotor to rotate.

2. The light-driven as claimed in claim 1, wherein said bottom plate is a cover slip selectively made of glass or plastic.

3. The light-driven as claimed in claim 1, wherein said bottom plate is selectively a glass fiber reinforced plastic sheet or graphite.

4. The light-driven as claimed in claim 1, wherein said bottom plate is selectively a polygon or a toothed disc plate.

5. The light-driven as claimed in claim 1, wherein said bottom plate is a square.

6. The light-driven as claimed in claim 1, wherein said thermally conductive sheet comprises at least one roughened surface, and a light-absorbing material attached to said at least one roughened surface to improve the heat absorption rate of said thermally conductive sheet, said light-absorbing material being selected from the group of graphite, carbon tape, carbon nanotube and graphene.

7. The light-driven as claimed in claim 1, wherein said thermally conductive sheet is selectively a copper foil for electrolysis, aluminum foil, silver foil, carbon fiber sheet or thermally conductive silicone film.

8. The light-driven as claimed in claim 1, wherein said leads are respectively extended from corners of said base portion of said thermally conductive sheet and respectively downwardly bent from the edge of said bottom plate to form a contact segment for contacting said water surface to set the heated position.

9. The light-driven as claimed in claim 8, wherein said contact segment of each said lead of said thermally conductive sheet is inwardly bent to form a positioning tip flatly attached to a bottom surface of said bottom plate.

10. The light-driven as claimed in claim 1, wherein said light-absorbing material is selected from the group of graphite, carbon tape, carbon nanotube and graphene.

11. The light-driven as claimed in claim 1, further comprising a quick-drying glue applied to corners of a bottom surface of base portion of said thermally conductive sheet and bonded to said upper surface of said bottom plate so that a gap is formed between said bottom plate and said thermally conductive sheet.

12. The light-driven as claimed in claim 1, wherein the surface of said bottom plate facing said thermally conductive sheet is selectively coated with a layer of vacuum grease, ointment or water repellent to form a hydrophobic film so that the gap formed between said bottom plate and said thermally conductive sheet is hydrophobic.

* * * * *